United States Patent
Li et al.

(10) Patent No.: US 8,890,389 B2
(45) Date of Patent: Nov. 18, 2014

(54) ELECTRIC MOTOR

(75) Inventors: Yue Li, Hong Kong (CN); Mao Xiong Jiang, Shenzhen (CN); Jian Zhao, Shenzhen (CN); Zhi Jun Wang, Shenzhen (CN); Ya Ming Zhang, Shenzhen (CN); Hai Hui Xiang, Shenzhen (CN)

(73) Assignee: Johnson Electric S.A., Murten (CH)

( * ) Notice: Subject to any disclaimer, the term of this patent is extended or adjusted under 35 U.S.C. 154(b) by 238 days.

(21) Appl. No.: 13/481,577

(22) Filed: May 25, 2012

(65) Prior Publication Data

US 2012/0299405 A1 Nov. 29, 2012

(30) Foreign Application Priority Data

May 26, 2011 (CN) .......................... 2011 1 0143264

(51) Int. Cl.
*H02K 1/26* (2006.01)
*H02K 9/06* (2006.01)
*H02K 23/04* (2006.01)
*H02K 23/40* (2006.01)
*H02K 16/04* (2006.01)
*H02K 1/14* (2006.01)
*H02K 23/30* (2006.01)

(52) U.S. Cl.
CPC ............ *H02K 23/04* (2013.01); *H02K 2213/03* (2013.01); *H02K 23/40* (2013.01); *H02K 16/04* (2013.01); *H02K 1/146* (2013.01); *H02K 23/30* (2013.01)
USPC .................... 310/266; 310/261.1; 310/154.06

(58) Field of Classification Search
None
See application file for complete search history.

(56) References Cited

U.S. PATENT DOCUMENTS

| | | | | |
|---|---|---|---|---|
| 3,602,749 A | * | 8/1971 | Esters | 310/154.21 |
| 5,554,903 A | * | 9/1996 | Takara | 310/266 |
| 5,773,910 A | * | 6/1998 | Lange | 310/266 |
| 5,783,893 A | * | 7/1998 | Dade et al. | 310/266 |
| 6,459,185 B1 | * | 10/2002 | Ehrhart et al. | 310/156.45 |
| 6,590,312 B1 | | 7/2003 | Seguchi et al. | |
| 7,626,299 B2 | * | 12/2009 | Yoshikawa et al. | 310/114 |
| 2003/0227231 A1 | | 12/2003 | Ostovic | |
| 2004/0027011 A1 | * | 2/2004 | Bostwick et al. | 310/58 |
| 2005/0184612 A1 | * | 8/2005 | Cros et al. | 310/158 |
| 2009/0309442 A1 | * | 12/2009 | Qu et al. | 310/114 |

FOREIGN PATENT DOCUMENTS

| | | |
|---|---|---|
| JP | 2005-333727 | 12/2005 |
| JP | 2007-215397 | 8/2007 |
| JP | 2010-98853 | 4/2010 |

* cited by examiner

*Primary Examiner* — Tran Nguyen
(74) *Attorney, Agent, or Firm* — Muncy, Geissler, Olds & Lowe, P.C.

(57) ABSTRACT

An electric motor includes an inner stator including inner magnetic poles arranged circumferentially, an outer stator including outer magnets arranged circumferentially, and a rotor rotatably disposed between the inner and outer stators. The rotor includes a shaft, a rotor core fixed to the shaft and a winding wound on the rotor core. The rotor core includes a ring shaped yoke having a plurality of inner teeth extending inwardly and a plurality of outer teeth extending outwardly. The winding includes a plurality coils each including an inner side received in a corresponding inner slot formed between adjacent inner teeth and an outer side received in a corresponding outer slot formed between adjacent outer teeth.

9 Claims, 3 Drawing Sheets

ELECTRIC MOTOR

CROSS REFERENCE TO RELATED APPLICATIONS

This non-provisional patent application claims priority under 35 U.S.C. §119(a) from Patent Application No. 201110143264.9 filed in The People's Republic of China on May 26, 2011.

FIELD OF THE INVENTION

This invention relates to an electric motor and in particular, to an electric motor with two stators.

BACKGROUND OF THE INVENTION

A traditional brush motor usually comprises a stator and a rotor pivotably mounted with respect to the stator. The rotor comprises a rotor core with a plurality of radial extended teeth and a lap-type winding with a plurality of coils each wound around several teeth. Each coil has portions overlapping adjacent coils. The stator comprises one or more permanent magnets confronting the teeth of the rotor.

However, the winding of the above traditional brush motor has a long winding head at each axial end of the rotor core due to the overlapping of adjacent coils, which increases the axial length of the motor and reduces the usage ratio of the winding, as the winding head does not contribute to the electromotive force produced by the motor.

SUMMARY OF THE INVENTION

Hence there is a desire for an electric motor which has a reduced axial length and increased usage ratio of the winding.

Accordingly, in one aspect thereof, the present invention provides an electric motor comprising: an inner stator comprising inner magnetic poles arranged along a circumferential direction of the motor; an outer stator comprising outer magnetic poles arranged along the circumferential direction; and a rotor rotatably disposed between the inner and outer stators, the rotor comprising a shaft, a rotor core fixed to the shaft and a winding wound on the rotor core; wherein the rotor core comprises a ring shaped yoke having a plurality of inner teeth extending inwardly and a plurality of outer teeth extending outwardly; and the winding comprises a plurality coils, each coil comprising an inner side received in a corresponding inner slot formed between adjacent inner teeth and an outer side received in a corresponding outer slot formed between adjacent outer teeth, and the inner sides of the coils face the inner magnetic poles and the outer sides of the coils face the outer magnetic poles.

Preferably, the inner slot and outer slot for the same coil are offset in the circumferential direction of the yoke to increase the span of the coil.

Preferably, the centerline of the inner magnetic pole is offset from the centerline of a corresponding outer magnetic pole.

Preferably, the offset angle formed between the centerlines is 9 degrees.

Preferably, the rotor further comprises a bracket comprising a mounting section fixed to the shaft and a connection section extending radially outwardly from the mounting section, the connection section being located at one axial end of and fixed with the rotor core.

Preferably, the motor further comprises a commutator fixed to the shaft, and a plurality of brushes arranged in sliding contact with the commutator, the winding being electrically connected to the commutator and the brushes being electrically connectable to a power source.

Preferably, the number of brushes is equal to the number of inner magnetic poles.

Preferably, the motor further comprises a housing with two open ends, and two end caps respectively fixed to the open ends of the housing, the inner stator being located inside of the rotor core and fixed with one end cap, the outer magnetic poles of the outer stator being fixed to an inner surface of the housing.

Preferably, a first end of the shaft extends through one end cap and a fan is mounted to the first end of the shaft.

Preferably, the end caps have a plurality of vents to allow airflow generated by the fan to pass through the motor.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
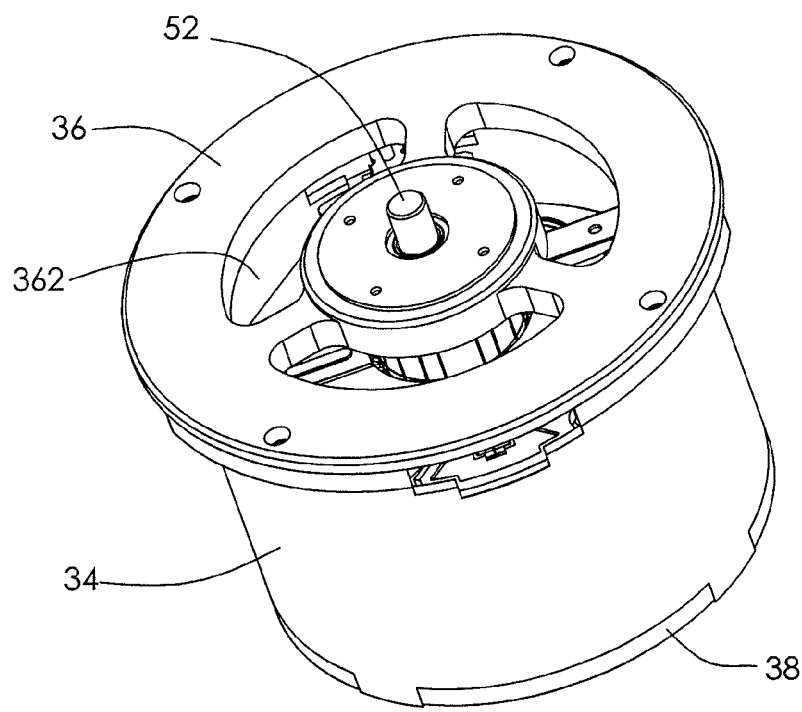
FIG. 1 illustrates an electric motor in accordance with a preferred embodiment of the present invention.
Figure 2:
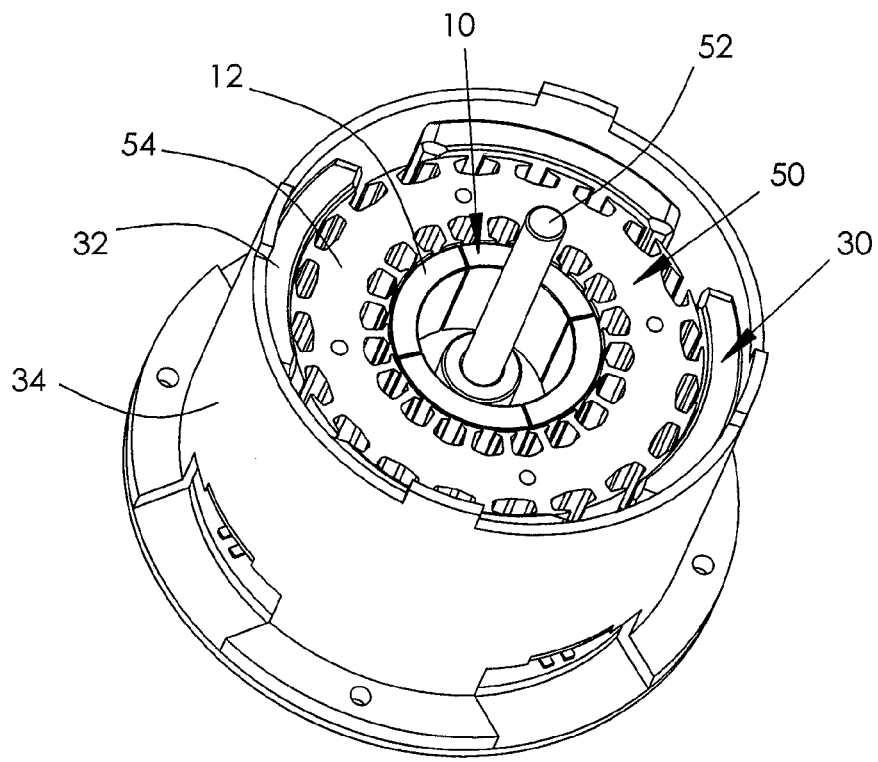
FIG. 2 illustrates the motor of FIG. 1 in a reverse aspect, with the rotor winding and one end cap of the motor omitted to show the inside of the motor.
Figure 3:
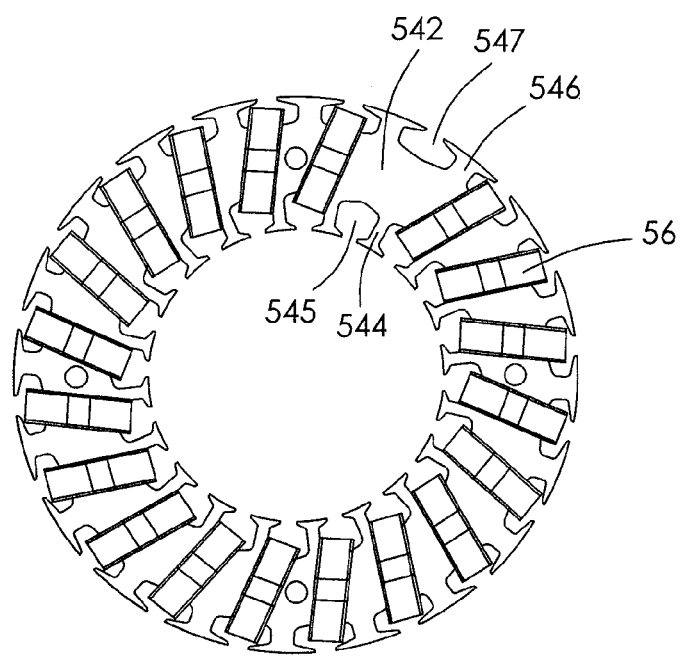
FIG. 3 illustrates a rotor core and rotor winding of the motor of FIG. 1, with one coil of the rotor winding omitted to show the structure of the rotor core.
Figure 4:
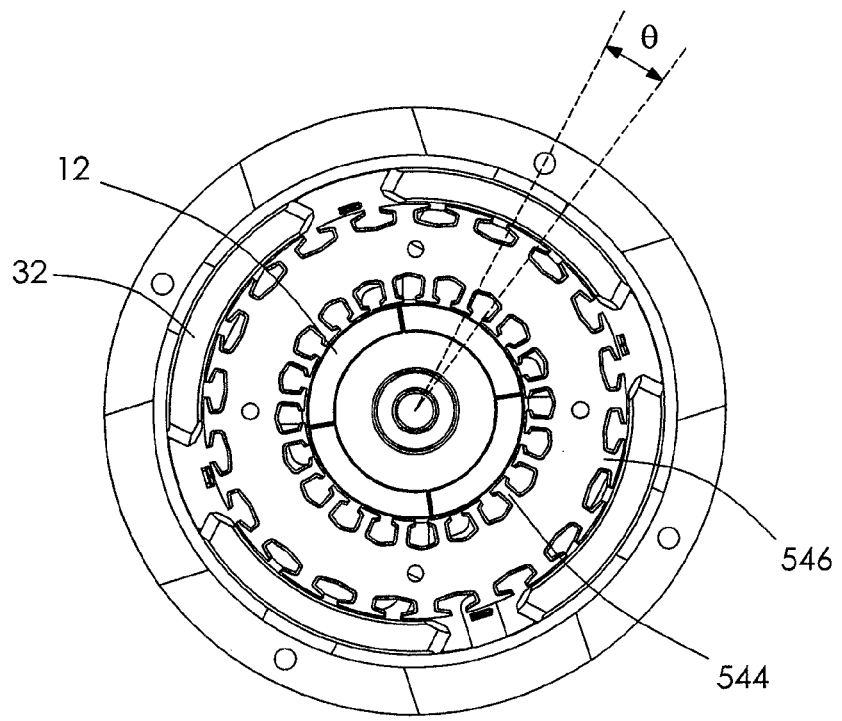
FIG. 4 is an end view of the arrangement of FIG. 2.

The figures illustrate an electric motor according to a preferred embodiment of the present invention. The motor comprises an inner stator 10, an outer stator 30, and a rotor 50 rotatably disposed between the inner and outer stators 10, 30.

The rotor 50 comprises a shaft 52, a rotor core 54 fixed on the shaft 52, and a rotor winding 56 wound on the rotor core 54. The rotor core 54 is made of magnetic material and comprises a ring shaped yoke 542. The yoke has a plurality of inner teeth 544 extending inwardly from the yoke 542 and a plurality of outer teeth 546 extending outwardly from the yoke 542. The rotor winding 56 comprises a plurality of coils wound on the yoke 542. Each coil comprises an inner side received in a corresponding inner slot 545 formed between adjacent inner teeth 544 and an outer side received in a corresponding outer slot 547 formed between adjacent outer teeth 546. The inner slot 545 and outer slot 547 for the same coil are offset in the circumferential direction of the yoke 542 in order to increase the span or width of the coil to allow more magnetic flux from the stators to pass there through. In this embodiment, the angle formed between the line from the center of the rotor to the center of the inner slot 545 and the line from the center of the rotor to the center of the corresponding outer slot 547 for the same coil is 9 degrees.

The motor further comprises a cylindrical motor housing 34 with two open ends. Two end caps 36, 38 are respectively fixed to the open ends of the housing 34. The stators and rotors are received in the housing 34. The shaft 52 is pivotably mounted to the end caps 36, 38 via bearings. Ends of the shaft 52 extend through the corresponding end caps 36, 38. A fan 90 is mounted to the end of the shaft 52 extending through the end cap 38. The end caps 36, 38 have a plurality of vents 362, 382 allowing airflow generated by the fan 90 to pass through the motor to cool the inside of the motor, including the winding 56 and rotor core 54.

The inner stator 10 comprises a layer of inner magnets 12 facing the inner teeth 544 of the rotor 50 and the outer stator 30 comprises a layer of outer magnets 32 facing the outer teeth 546 of the rotor 50. The inner magnets 12 form a plurality of arcuate inner magnetic poles, four inner magnetic poles in this embodiment. The outer magnets 32 form a plurality of arcuate outer magnetic poles, four outer magnetic poles in this embodiment. The inner stator 10 is fixed with respect to the end cap 38. The outer magnets 32 of the outer stator 30 are fixed to an inner surface of the motor housing 34. As the inner slot 545 and outer slot 547 for the same coil are offset in the circumferential direction of the yoke 542, the centerline (from the center of the rotor to the middle of the magnetic pole) of each inner magnetic pole is offset from the centerline of the corresponding outer magnetic pole. In this embodiment, the offset angle $\theta$ is equal to 9 degrees.

Figure 5:
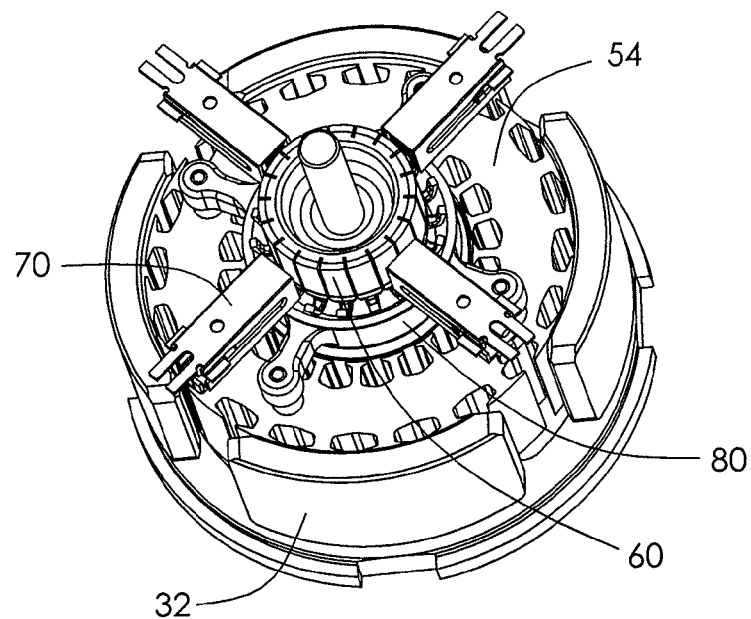
FIG. 5 illustrates the motor of FIG. 1, with the rotor winding, housing and one end cap thereof removed.
Figure 6:
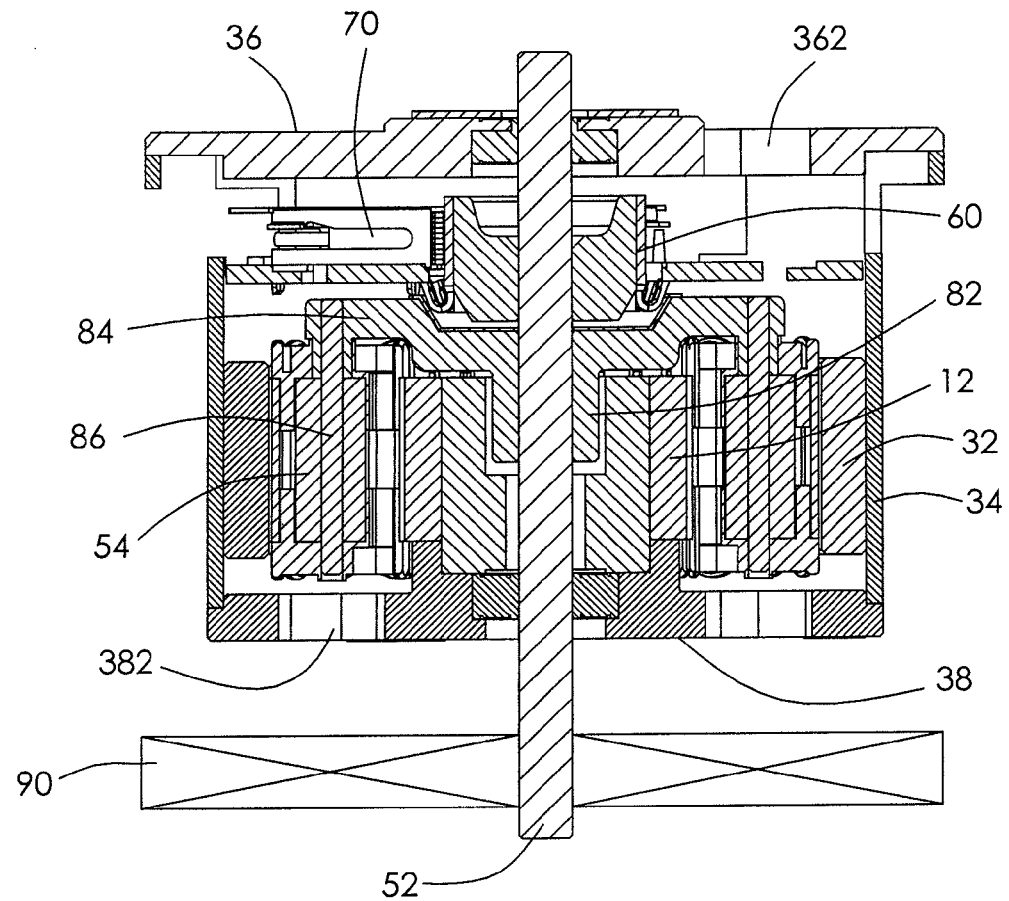
FIG. 6 is a longitudinal sectional view of the motor of FIG. 1 with a fan.

Referring to FIGS. 5 and 6, the rotor 50 comprises a commutator 60 fixed to the shaft 52. The winding 56 is electrically connected to the commutator 60. The motor further comprises a plurality of brushes 70 arranged to slidably contact the commutator 60. The number of the brushes 70 is equal to the number of the inner magnetic poles 12. The rotor core 54 is fixed to the shaft 52 via a bracket 80. Specifically, the bracket 80 comprises a mounting section 82 fixed to the shaft 52 and a connection section 84 extending outwardly from the mounting section 82. The connection section 84 and the rotor core 54 have a plurality of coaxial securing holes. A fastener such as a pin 86 is fixed in the securing holes to thereby fix the rotor core 54 to the bracket 80, which is fixed on the shaft 52.

In the present invention, the winding 56 has a plurality of coils which are respectively wound on the yoke 542 and inner and outer sides of each coil respectively facing the inner and outer magnets 12, 32. Thus, each coil has a short winding head protruding beyond the axial end faces of the rotor core 54 to thereby increase usage of the winding 56. The winding head of each coil is short as it does not overlap another coil and the distance across the yoke from the outer coil slot to the inner coil slot is short. Furthermore, as each slot of the yoke accommodates only one coil and as opposite sides of each coil are respectively located on the inside or outside of the yoke, the coils can be effectively cooled. The air gap between the inner stator and the yoke and the air gap between the outer stator and the yoke provide two air flow pathways over the rotor which cools both sides of the yoke (inner side and outer side) as well as both sides of the coils.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. An electric motor comprising:
   an inner stator comprising inner magnetic poles arranged along a circumferential direction of the motor;
   an outer stator comprising outer magnetic poles arranged along the circumferential direction; and
   a rotor rotatably disposed between the inner and outer stators, the rotor comprising a shaft, a rotor core fixed to the shaft and a winding wound on the rotor core;
   wherein the rotor core comprises a ring shaped yoke having a plurality of inner teeth extending inwardly and a plurality of outer teeth extending outwardly; and
   the winding comprises a plurality coils, each coil comprising an inner side received in a corresponding inner slot formed between adjacent inner teeth and an outer side received in a corresponding outer slot formed between adjacent outer teeth, and the inner sides of the coils face the inner magnetic poles and the outer sides of the coils face the outer magnetic poles;
   wherein the rotor further comprises a bracket comprising a mounting section fixed to the shaft and a connection section extending radially outwardly from the mounting section, the connection section being located at one axial end of and fixed with the rotor core, and
   wherein the motor further comprises a commutator fixed to the shaft, and a plurality of brushes arranged in sliding contact with the commutator, the winding being electrically connected to the commutator and the brushes being electrically connectable to a power source, the bracket defining a recess and an axial end of the commutator being received in the recess of the bracket.

2. The motor of claim 1, wherein the inner slot and outer slot for the same coil are offset in the circumferential direction of the yoke to increase the span of the coil.

3. The motor of claim 2, wherein the centerline of the inner magnetic pole is offset from the centerline of a corresponding outer magnetic pole.

4. The motor of claim 3, wherein the offset angle formed between the centerlines is 9 degrees.

5. The motor of claim 1, wherein the number of brushes is equal to the number of inner magnetic poles.

6. The motor of claim 1, wherein the motor further comprises a housing with two open ends, and two end caps respectively fixed to the open ends of the housing, the inner stator being located inside of the rotor core and fixed with one end cap, the outer magnetic poles of the outer stator being fixed to an inner surface of the housing.

7. The motor of claim 6, wherein a first end of the shaft extends through one end cap and a fan is mounted to the first end of the shaft.

8. The motor of claim 7, wherein the end caps have a plurality of vents to allow airflow generated by the fan to pass through the motor.

9. The motor of claim 1, wherein the inner stator defines a central recess and the mounting section of the bracket comprises an axial end received in the central recess of the inner stator.

* * * * *